United States Patent [19]
Cannon et al.

[11] Patent Number: 4,476,816
[45] Date of Patent: Oct. 16, 1984

[54] STAGED CASCADE FLUIDIZED BED COMBUSTOR

[76] Inventors: Joseph N. Cannon, 4103 Farragut St., Hyattsville, Md. 20781; David E. De Lucia, 58 Beacon St., Apt. No. 2, Boston, Mass. 02108; William M. Jackson, 5300 McArthur Blvd., NW., Washington, D.C. 20016; James H. Porter, P.O. Box 1131, Daggett Ave., Vineyard Haven, Mass. 02568

[21] Appl. No.: 436,246

[22] Filed: Oct. 25, 1982

[51] Int. Cl.³ .............................................. F22B 1/02
[52] U.S. Cl. .................................. 122/4 D; 110/245; 110/263; 110/347; 165/104.16; 422/142
[58] Field of Search ............... 122/4 D; 110/245, 263, 110/347; 422/142; 165/104.16; 431/7, 170

[56] References Cited
U.S. PATENT DOCUMENTS

| | | | |
|---|---|---|---|
| 3,288,878 | 11/1966 | Hachmuth | 422/142 X |
| 3,431,892 | 3/1969 | Godel | 122/4 D |
| 3,902,462 | 9/1975 | Bryers | 122/4 D |
| 4,135,885 | 1/1979 | Wormser et al. | 422/142 |
| 4,136,061 | 1/1979 | Hogan et al. | 422/142 |
| 4,154,585 | 5/1979 | Melcher et al. | 110/245 X |
| 4,279,205 | 7/1981 | Perkins et al. | 122/4 D |

*Primary Examiner*—Edward G. Favors
*Attorney, Agent, or Firm*—Cesari & McKenna

[57] ABSTRACT

A fluid bed combustor comprising a plurality of fluidized bed stages interconnected by downcomers providing controlled solids transfer from stage to stage. Each stage is formed from a number of heat transfer tubes carried by a multiapertured web which passes fluidizing air to upper stages. The combustor cross section is tapered inwardly from the middle towards the top and bottom ends. Sorbent materials, as well as non-volatile solid fuels, are added to the top stages of the combustor, and volatile solid fuels are added at an intermediate stage.

9 Claims, 4 Drawing Figures

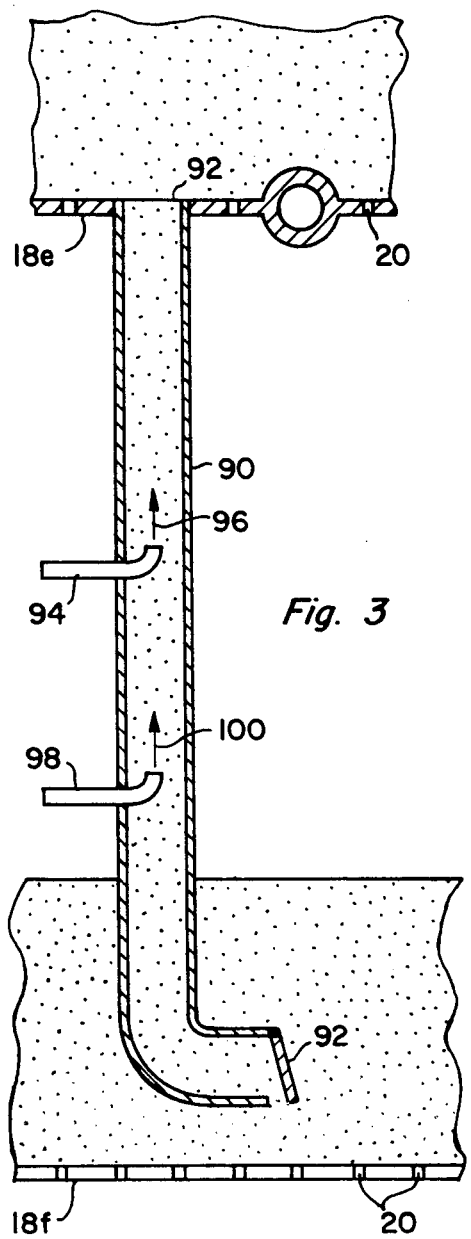

|  | SCFBC | SCFBC | AFBC |
|---|---|---|---|
| steam rate (kilopounds/hr) | 100 | 100 | 100 |
| coal rate (lb/hr) | 9,800 | 9,800 | 9,800 |
| air rate (lb/hr) | 107,000 | 107,000 | 107,000 |
| fluidization vel. (ft/sec) | 8 | 8 | 8 |
| distributor cross section (ft$^2$/°F) | | | |
|    lowest (ash cooling) stage | 61/200 | 61/200 | |
|    each combustion stage | 186/1550 | 186/1550 | 1 bed, 186/1550 |
|    top sorbent preheat stage | 75/350 | 75/350 | – |
| sorbent | dolomite | limestone | limestone |
| sorbent feed rate (lb/hr) | 1700 | 1830 | 3675 |
| ash & spent sorbent discharge (lb/hr) | 3328 | 2988 | 4506 |
| Boiler tube surface (ft$^2$) | | | |
|    combustion beds | 1040 | 1040 | 1040 |
|    gas cooling | 2400 | 2400 | 8450 |
| U(bed) (BTU/hr/ft$^2$/°F) | 40 | 40 | 40 |
| U(gas cooling) (BTU/hr/ft$^2$/°F) | 40 | 40 | 10 |
| Stages: | | | |
|    solids cooling | 2 | 2 | 0 |
|    combustion | 2 | 2 | 1 |
|    gas cooling | 6 | 6 | 0 |
|    Total | 10 | 10 | 1 |

FIG. 4

STAGED CASCADE FLUIDIZED BED COMBUSTOR

The invention described herein was made with government support under contract with the Department of Energy. The government has certain rights in this invention.

BACKGROUND OF THE INVENTION

A. Field of the Invention

The invention relates to fluidized bed combustors.

B. Prior Art

Fluidized bed systems are commonly used in the chemical processing industry for a variety of applications such as facilitating chemical reactions between various constituents, and for drying, coating, and other processes. Similarly, they find frequent use in the petroleum industry for the catalytic cracking of hydrocarbons.

Fluidized bed systems are also used to generate heat by the combustion of coal and other solid fossil fuel to produce steam as an output product. If the combustion occurs at atmospheric pressure, these systems are referred to as atmospheric fluidized bed combustors (AFBC). Typically such systems utilize a single fluidized bed, commonly four to six feet in depth, and operating at fluidization velocities of from four to nine feet per second. Heat recovery from these systems is obtained through heat transfer to tubes imbedded in the fluidized bed itself and containing a heat transfer fluid such as water or steam, as well as from tubes positioned above the bed in the path of hot gasses emerging from the bed. While such systems offer promise, they require a significant capital expenditure per pound of output steam.

Present generation fluidized bed combustors accomodate combustion of a wide variety of fossil fuels (of varied fuel heating value, ash content, and sulfur content) with the potential for controlling sulfur oxide emissions and reducing NOx (nitrous oxide) generation. Sulfur oxide emissions are controlled by adding sorbents such as limestone or dolomite to the burning fuel mass. The sulfur oxide gases generated during combustion react with limestone to form calcium sulfate and with dolomite to form calcium and magnesium sulfate. Thus, sulfur is retained as a solid product and removed from the bed along with the bed ash material.

The fluid bed normally operates in a temperature range of between 1450° F. and 1600° F. NOx formed by atmospheric nitrogen fixation is not a dominant reaction path for NOx generation at these temperatures. Thus, the conversion of fuel bound nitrogen to NOx is the only significant reaction pathway leading to NOx formation within the fluid bed. Hydrocarbon emissions, primarily CO, may be controlled by adding sufficient excess air to the combustor. Ash and spent solids are removed from the fluidized bed while still very hot and are conveyed to ash storage bins by water cooled conveying screws.

Particulate control is still a troublesome issue in fluid bed combustor operation. Adequate particulate separation and collection equipment is required external to the combustor to remove particulates from exhaust combustion gases, and these frequently are quite costly.

An example of a combustor using separate desulfurization and combustion beds is shown in U.S. Pat. No. 4,135,885 issued Jan. 23, 1979, to Alex F. Wormser et al. Sorbent material is applied separately to both beds. In one embodiment, heat transfer from the desulfurization bed is eliminated and sorbent material from this bed is instead passed on to the combustion bed from which it is temporarily withdrawn (together with the sorbent separately applied to this bed) for external storage during periods of turndown in order to conserve heat resident in the sorbent. Heat transfer capacity is significantly diminished in this embodiment, and only limited sorbent transfer between beds occurs.

The cost of a fluidized bed combustor relative to equivalent coal burning facilities which provide an equivalent amount of steam and the same degree of environmental control are about equal. However, more stringent environmental controls and design operating specifications in the fluid bed facility increase the cost of present generation combustors. Increasing the sulfur retention requirements, for example, requires a greater rate of sorbent addition in an AFBC, resulting in greater costs for the sorbent and waste disposal, as well as reduced combustor efficiency due to heat absorption by the in-bed calcination of additional limestone. Particulate carry-over in the combustion gas is also increased by the attrition of the additional sorbent. Sorbent selection is critical in controlling costs, since for good limestones only one fifth to one third of the calcium in the stone combines with sulfur. The remainder of the calcium, initially in the carbonate form, is calcined to the oxide form, absorbing heat.

Most AFBC combustors are currently designed to operate between four and nine feet/second fluidization velocities. These velocities correspond to heat liberation rates of between 280,000 and 640,000 BTU/hour-ft$^2$. of fluid bed surface area at twenty percent excess air rates. It is obviously desirable to operate at the higher velocities in order to reduce combustor size per unit of energy output. However, at the higher velocities, the following events occur which diminish the performance and increase the cost of facility:

(a) more solids are entrained in the combustion exhaust gas, leading to: increased requirements for particulate control, a reduction in carbon utilization due to the escape of char from the bed as fines before complete burn-out, and increased potential hazard of burning carbon particles penetrating the downstream gas clean-up system;

(b) gas phase residence times in the bed are shortened, leading to poor calcium utilization for sulfur oxide capture. This may be compensated for by using deeper beds to maintain design levels of sulfur oxide control; however, operating with deep beds requires a greater expenditure of power to operate combustion air blowers.

Approximately fifty percent of the thermal energy released to produce steam is absorbed by boiler tubes immersed in the bed. Heat transfer coefficients to the boiler tubes range from thirty to fifty BTU/hour/ft$^2$/°F. However, the remaining fifty percent of the energy is removed in the convective banks where heat transfer coefficients range from five to fifteen BTU/hour/ft$^2$/°F. This results in approximately twenty-five percent of the tube surface area being immersed in the bed, and the remaining seventy-five percent in the convective bank. Reducing the excess air requirements shifts a greater fracton of the thermal absorption requirements to the bed, where less heat transfer face is required per unit of heat absorbed. The greater quantity of unburned reducing hydrocarbons locally available surrounding a burning coal particle results in reduced NOx generation; however, CO and unburned hydrocarbon emissions increase.

The feeding of fuel to such systems, and the removal of the spent residue therefrom, poses significant problems. Failure to provide for even fuel distribution throughout the combustion bed leads to localized reducing zones in the areas of excess fuel. This causes large temperature gradients and leads to inefficient heat transfer. Further, the reducing zones do not remain wholly stationary on the bed and thus differing portions of the bed are exposed alternately to oxidizing and reducing environments, thus hastening corrosive deterioration. Various kinds of fuel feeders have been used in an attempt to combat this problem, but most of these are quite costly and further increase the significant capital costs of such combustors.

The removal of undesired pollutant gases and particulates in such systems is also difficult and generally costly. Reactant materials such as limestone or dolomite are commonly added to the fluidized bed to remove constituents such as sulfur oxides which result from the combustion process. However, the reaction between these reactants and the combustion products is frequently significantly less than complete. Thus, the unwanted constituents are only partially removed, and a large portion of the reactant material remains unreacted and, to that extent, wasted.

Present designs of AFBC boilers are thus highly constrained; every change in design specification which improves certain aspects in cost and performance normally produces other detrimental cost and performance factors.

BRIEF DESCRIPTION OF THE INVENTION

Objects of the Invention

Accordingly, it is an object of the invention to provide an improved fluidized bed combustor.

Further, it is an object of the invention to provide a fluidized bed combustor characterized by enhanced heat transfer capabilities and reduced heat transfer surface area requirements.

Further, it is an object of the invention to provide a fluidized bed combustor having a lower capital cost per unit of steam output than present solid fuel combustors.

Further, it is an object of the invention to provide an improved fluidized bed combustor which is particularly efficient in removing undesired combustion products from the combustion exhaust gas while using less sorbent material for sulfur oxide capture than conventional AFBC's.

Further, it is an object of the invention to provide for simpler and less costly fuel feeding and ash removal systems than currently used in conventioal AFBC's, thereby overcoming the problems associated with fuel distribution.

Further, it is an object of the invention to provide a fluidized bed combustor of increased thermal and combustion efficiencies.

BRIEF DESCRIPTION OF THE INVENTION

In accordance with the present invention, a staged fluidized bed combustor comprises a plurality of zones, each zone including one or more fluidized-bed stages performing one or more of the principal functions of combustion, heat transfer, and undesired constituent removal. The majority of stages each consist of a distributor plate formed from a number of heat-transfer tubes carried by a multi-apertured web which provide support for the bed while passing fluidizing gas to upper stages through the apertures, and is connected to the adjacent lower stage by one or more downcomers providing controlled solids transfer from stage to stage.

The fire side of the combustor has preferably four zones, each characterized by the principal functions performed by the zones, namely:

(1) a sorbent preheat-calcination-sulfur oxide capture zone with consequent cooling of the combustion exhaust gas occuring over several stages;

(2) a coal volatiles combustion-sulfur oxide capture zone (which may comprise a single stage);

(3) a coal char combustion-sulfur oxide capture zone (which also may comprise a single stage); and;

(4) an ash cooling-air preheat zone occuring over one or more stages at the bottom of the combustor.

Preferably, all zones except zone 4 contain boiler (heat transfer) tubes integral with the distributor plate and/or immersed in the fluidized beds.

The fire side of the combustor is designed to carry out several physical-chemical phenomena which occur simultaneously in a conventional AFBC, but at optimal conditions and in separate zones in the staged fluid bed combustor (SCFBC). Optimal conditions are provided by counter-current staged contacting of combustion air and the gaseous products of combustion with the reacting solids, coal and limestone or dolomite and the spent solid products of combustion. Optimal temperature conditions are provided at each stage by the inclusion of heat transfer surfaces in each stage to remove heat.

Operation of the fire side of the SCFBC is similar to a continuous distillation column, except that its primary function is to carry out heat transfer and chemical reaction processes, as opposed to mass transfer processes. The liquid phase in a distillation column is replaced by a fluidized solids phase in the SCFBC. Limestone or dolomite is fed to the top stage of the combustor, combustion air is fed to the bottom stage, and coal or other solid fuels containing volatile constituents are fed to a stage near the center. Each stage is interconnected for serial solids flow, and these are passed from stage to stage through a downcomer. At each stage the solids are maintained in the fluidized state by gas flowing upwardly through the distributor plate. The height of the solids in the beds so formed is controlled by an overflow weir establishing the entrance to the downcomer. Entrained solids are prevented from falling into the downcomer by a cap above the downcomer entrance. Solids leave a stage by flowing over the weir and into the downcomer leading to the stage below. A flap is provided at the exit of the downcomer to prevent reverse gas flow into the downcomer.

The successive stages form the reaction zones earlier described. In particular, beginning at the top of the reactor, sorbent is applied to the top stage where it contacts cooled combustion exhaust gases. As the sorbent solids are transported towards the middle stages, they absorb some heat from the gas phase on each stage, thereby cooling the gas and preheating the sorbent to calcination temperatures. If a dolomitic limestone is used as the sorbent, magnesium carbonate will first calcine and react with residual $SO_2$ contained in the gas. As the solids proceed down through the column, the calcium phase of the dolomite calcines at temperatures of approximately 1400° F. Further sulfur oxide capture is possible after calcining the calcium phase.

Coal is fed to the combustor at the center stages, where temperatures range between 1500 and 1600° F. The volatiles from the entering coal rise and mix with oxygen to burn in the volatiles burnout stage, and the char falls on to the char burnout stage. Volatile sulfur gases oxidize to $SO_2$, and are captured by the calcined dolomite. The char reacts with air rising from the preheat section and burns on the char burnout stage.

Char combustion, which is limited by oxygen diffusion, is accelerated, since the char is in contact with the highest oxygen concentration. In a standard combustors, the oxygen content of air is often first reduced by volatiles burnout, leaving an oxygen depleted stream for burning the char. The volatiles in the SCFBC contact the depleted air stream and burn in a richer fuel environment, thus minimizing NOx production.

The volatiles burnout stage has an adequate expanded bed depth to provide sufficient residence time for at least some sulfur capture. Correspondingly, the char burnout bed has adequate bed depth to provide sufficient residence time for char burnout and at least some sulfur capture. The bed depths of the fuel burning stages vary with fuel sulfur content, the volatiles fraction in the fuel, and desired steam output. Boiler tubes are submerged in the bed and are part of the distributor plate to absorb heat released for steam raising.

The stages above the char burnout stage remove entrained carbonaceous particulate from the gas phase. This increases carbon residence time in the combustor, leading to greater combustion efficiency.

The spent sorbent and ash leaving the char burnout stage are cooled by preheating combustion air. There are no boiler tubes in the air preheat stages. Since the thermal capacity of the combustion air is much greater than that of the spent solids, one to three stages are required for heat recovery. These stages require only a four inch expanded bed depth to efficiently transfer heat between the spent solids and combustion air. The bed depths of the stages above the volatiles burn out stage are characterized by approximately six to nine inches expanded bed depth to thereby provide sufficient bed depth to cover the required number of tubes immersed in each bed for raising steam.

Coal is fed into the char burn out stage using a conventional spreader stoker which can feed wet and unscreened coal, up to inches in diameter, spreading the coal uniformly over the surface of the fluidized bed. Sorbent is applied to the top stage with a simple screw feeder, and ash is removed cold from the bed using a simple screw conveyor without water cooling. The ability to use standard components arising from the combustor design of the present invention significantly reduces capital costs of the system.

The stages operate at temperatures that are hottest at the center portion of the combustor (e.g., 1450°-1650° F. on the fuel combustion and volatiles burnout stages) and cooler at the top (250°-450° F.) and bottom (100°-400° F.) stages. They are enclosed within a shell having a cross section that is maximum at the central stages thereof and that tapers to a reduced cross section at the upper and lower ends, so that the stages at the combustion zone have the maximum cross section and those at the upper and lower portions have correspondingly reduced cross sections. This allows the fluidization gas velocity to remain constant on each stage as the gas heats and cools and thereby allows operation over a broad range of fluid velocities without defluidization.

Non-volatile char may be also be fed to the top stage of the combustor, together with the sorbent. The char reacts with nitrogen oxides formed in the combustion stages to reduce the oxides to nitrogen by the reaction:

$$C + 2NO = CO_2 + N_2$$

Heat extracted from the combustion gas by liquid water or steam using a countercurrent flow of liquid and combustion gases. In particular, the tubes of each stage originate and terminate in headers which are connected so as to form a steam raising circuit which conducts water and/or steam from the uppermost section of the combustor to the combustion zone. Preheated water from a preheater is fed to the top stages of the combustor which serves as a saturator. The temperature of the water is raised to its boiling point in the saturator by extracting heat from cooling combustion exhaust gas passing through this stage. The water, at its boiling point temperature, is returned to a steam drum. Saturated water is extracted from the steam drum and returned to the vaporizing stages of the boiler by means of a recirculation pump which feeds water at a sufficient rate to prevent film boiling and tube burnout in the vaporizing stages.

Water is vaporized to steam in the vaporizing stages by extracting heat from the cooling combustion exhaust gas in the upper section of the vaporizer, and by extracting heat from the burning mass of coal char and volatiles in the lower sections of the vaporizer. The water circuit in the vaporizer is arranged to conduct water from the cooler stages near the top of the vaporizer section to the hotter stages toward the center where combustion occurs. The steam-water mixture is returned to the steam drum after sufficient vaporization has occurred so as to prevent excessive pressure drop through the water circuit that is known to occur during two-phase flow. In the steam drum steam is disengaged from water. The steam withdrawn from the drum is conducted in part to a preheater to preheat the boiler feed water and in part to a superheat section located in the carbon burnout stage to produce superheat product steam.

Significant advantages arise from utilizing a plurality of serially connected staged beds, as well as from embedding the principal heat transfer surfaces within these beds. In particular, the heat transfer rate is significantly enhanced, for a given heat transfer surface area, by effecting the transfer in successive stages. Thus, one can significantly reduce the required heat transfer area and thus construction and operating costs. Further, the transfer takes place most efficiently within the fluidized bed and this further significantly enhances efficiency and reduces the required heat transfer surface area and thus further reduces construction ad operating costs.

Control of combustor output is a significant design problem in current fluidized bed combustors. Typically a "down" ratio (ratio of maximum to minimum steam generation rate) of from two to four is the best that is achievable. In the present invention, a turndown ratio of up to seven to one appears to be achievable by means of a modified downcomer which controls the solids flow rate from stage to stage and particularly between the volatiles burn out stage and the fuel combustion stage.

This downcomer comprises an underflow downcomer whose top is flush with the distributor plate of the upper stage and which controls the fluidized bed level on this stage by controlling the solids flow rate in the downcomer. This is accomplished by admitting a controlled flow of air near the base of the downcomer. The downcomer is operated in a regime where increasing the air rate increases the solids flow rate in the downcomer and causes a consequent reduction in bed level on the feed stage to the downcomer. This mechanism is used to control bed depth on the volatiles and char burnout stages. By reducing bed depth, boiler tubes initially immersed in the fluidized bed are uncovered and thereafter reside in the gas phase until the bed level is again changed. This causes a reduction in the rate of heat transfer to the boiler tubes and a consequent reduction in steam production during periods of reduced demand for steam.

Sorbent reactivation is also a desired part of a combustor system, but is accomplished only comparatively inefficiently in current combustor systems, and usually external to the combustor. In the present invention, sorbent reactivation is provided directly within the combustor (thus eliminating extraneous heat losses in the sorbent material caused by external reactivation) and is accomplished with expected higher efficiency by injecting steam directly into the downcomer from the volatiles burn out stage. Within the downcomer, the steam contacts spent sorbent (limestone or dolomite) which has been partially reacted to calcium and magnesium sulfate through contact with sulfur oxides on the volatiles burnout stage and above, and which has also been cooled by the air injected in the downcomer to 250°–400° F. Under these conditions, the steam hydrates the sulfated solids. When the solids are reheated as they enter the char burnout stage, the hydrated solids are dehydrated, thereby reopening the pore structure in the sorbent and making the interior sections of the sorbent particles containing active sorbent accessible for further sulfur oxide capture. Thus steam injection serves to reactivate the sorbent within the combustor, thus reducing sorbent requirements for sulfur oxide capture. This can provide as much as fifty percent savings in sorbent requirements for a given decontamination level. Sorbent reactivation may also be accomplished in the same manner on other stages above the volatiles burnout stage with consequent improvement in sorbent utilization.

DETAILED DESCRIPTION OF THE INVENTION

The foregoing and other and further objects and features of the invention will be more readily understood from the following detailed description of the invention, when taken in conjunction with the accompanying drawings, in which:

FIG. 3 is a vertical sectional view of and alternative form of downcomer used in connection with the present invention and providing both bed depth control and sorbent regeneration; and FIG. 4 is a chart showing comparative characteristics of a combustor designed in accordance with the present invention and standard currently available combustors.

Figure 1:
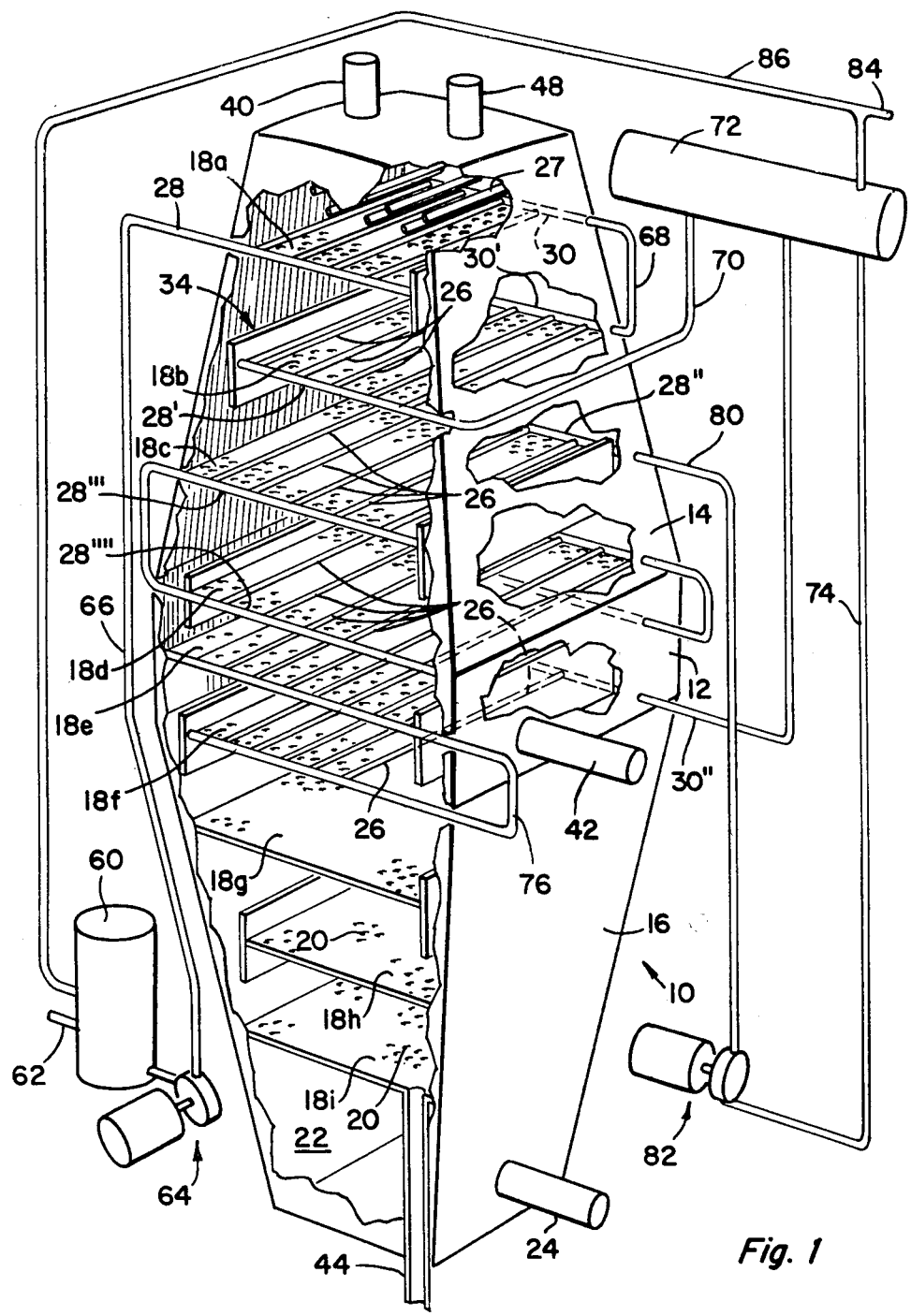
FIG. 1 is a diagrammatic view, in perspective, of a fluidized bed combustor in accordance with the present invention.

In FIG. 1, a combustor 10 in accordance with the present invention is formed from a shell having a broadened intermediate portion 12 and inwardly tapered upper and lower portions 14, 16, respectively. A number of distributor plates 18a–18i are arranged in parallel with each other, and vertically spaced from each other, within the shell. The lower plates (18g–18i) comprise flat plates through which apertures 20 extend. Feed air applied to a plenum 22 through a port 24 passes upwardly through the combustor 10 by way of the apertures 20.

The upper distributor plates of the combustor, i.e., plates 18a–18f, are formed from a plurality of horizontally spaced, parallel heat transfer tubes 26 joined by a flat web 28 (see FIG. 2) having apertures 20 therethrough similar to those of plates 18g–18i. The tubes 26 terminate in front and rear headers 28, 30, respectively, for receiving heat transfer fluids from, and transferring such fluids to, the tubes 26. Further heat transfer tubes 27 are located above the distributor plates on the upper stages and are located for embedment within the fluid bed (typically six to nine inches bed depth above the combustion zone and six to twenty inches in the combustion zone). For convenience of illustration, these tubes are shown only partially (and only in connection with the top stage) in FIG. 1 but are shown more fully in FIG. 2. The tubes 27 also extend between the headers of the stage on which they are located and in parallel with the integrally embedded tubes 26.

Figure 2:
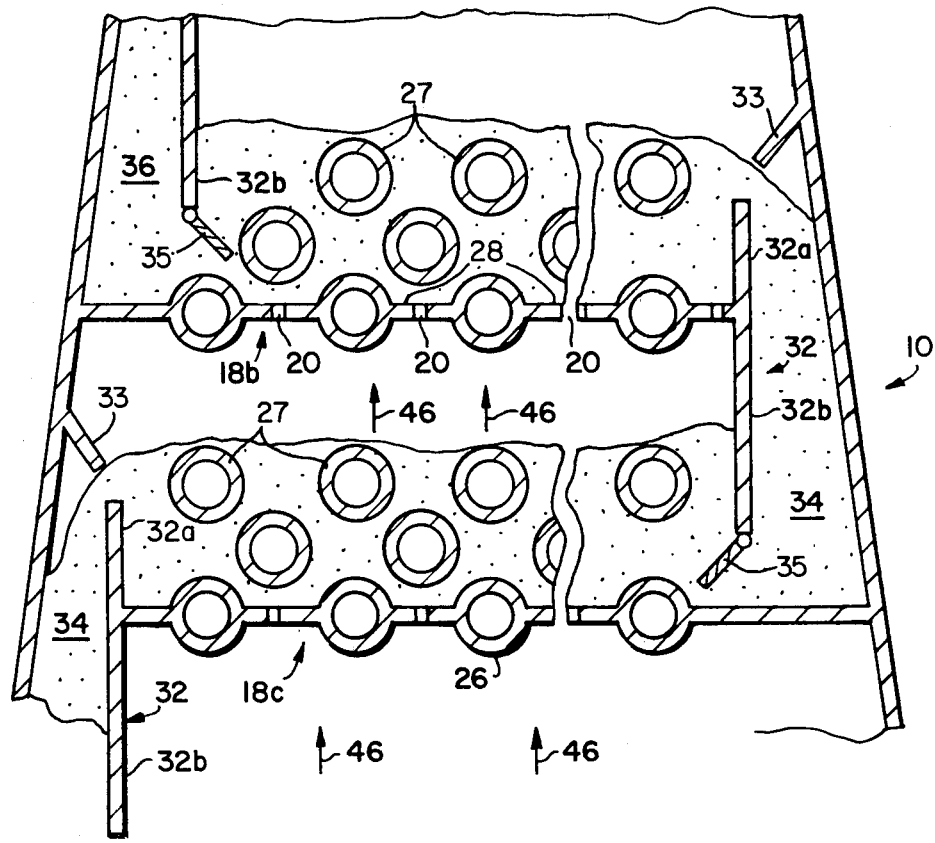
FIG. 2 is a vertical sectional view of a portion of the combustor of FIG. 1 showing the fluidized bed stages in more detail.

As seen more clearly from FIG. 2, one side of each distributor plate (e.g., the left end of distributor plate 18b and the right side of distributor plate 18c) is securely fastened to the wall of the combustor 10, while the other side terminates in a vertically extending flange 32 having an upper portion 32a extending above the plate, and a lower portion 32b extending below the plate. The portion 30a forms a weir which controls the height of the fluidized bed 34 resident on each stage of the combustor and, together with the lower portion 32b, also serves as one wall of a downcomer 36 through which fluidized particles pass from stage to another; the other wall of the downcomer is formed by the wall of the combustor 10. A "cap" 33 extends outwardly from the wall of combustor 10 over the downcomer throat to limit admission of particles blown up from the bed, while a hinged flap 35 at the discharge end of the downcomer limits backflow into it.

Sorbent material such as limestone or dolomite is fed to the uppermost stage of the combustor (FIG. 1) via a feed port 40 (FIG. 1), and volatile fuel is fed to the middle or intermediate stage of the combustor via a port 42. A simple spreader-stoker (not shown) is adequate to feed the volatile solid fuel. The sorbent material passes downwardly through each stage of the combustor via the successive downcomers 34, and ultimately emerges from a discharge port 44. As it travels downwardly, it is maintained in the form of a fluidized bed 34 on each stage by means of the moving air and gases (indicated by arrows 46 in FIG. 2 which pass upwardly from the lower stages of the combustor and which exit through a discharge port 48. During its downwardly passage, it travels across each distributor plate from one side of the contactor to the other, through the downcomer, and on to the next distributor plate. In so doing, it is brought into continuous contact with the upwardly moving combustion gases and "scrubs" these gases by removing sulfur, nitrogen oxides, and other undesired constituents from these gases.

The volatile solid fuels introduced through port 42 are burned in the central combustor stage, e.g., stage 18f (FIG. 1). Volatile constituents of the solid fuel that are driven off without combustion in this stage are burned in the stage immediately above.

Turning now to the "steam" side of the system, a heat transfer fluid such as water is applied to preheater 60 through an inlet pipe 62. A pump 64 pumps the fluid through a pipe 66 to uppermost distributor 28 from whence it travels through the first distributor stage 18a to rear header 30. Header 30 is connected by a pipe 68 to a corresponding header 30' in distributor stage 18b and the heat transfer fluid thus flows through the heat transfer pipes 26 of this stage to front header 28' and thence out through a return line 70 to a steam drum 72.

Steam is stripped from the fluid in steam drum 72 and liquid is withdrawn from this drum via a line 74 to a recirculation pump 82 and then through pipe 80 to rear header 28" on combustor stage 18c. The heat transfer fluid passes through the pipes of this stage to front header 28'" and then passes downwardly to the header 28"" of combustor stage 18d from whence it travels through the heat transfer pipes 26 of this stage to the rear header. The stages 18c–18f are arranged to form part of a fluid series loop so that the heat transfer fluid passes through each stage in sequence, beginning with stage 18c, and ending with stage 18f. The fluid exits from stage 18f through header 30" and is returned to the steam drum 72. Product steam (i.e., the desired end product of the combustion sequence) is taken from steam drum 72 and supplied to the user via a line 84. Additionally, a portion of this steam is fed back via a line 86 to the preheater 60 which serves to elevate the temperature of the feed liquid prior to its application to stage 18a.

The various stages of the combustor described herein effectively form separate "zones" in which different phases of the combustion-heat transfer-contaminant capture process are emphasized and performed with efficiency. In particular, the uppermost stages 18a–18d preheat the sorbent material applied through port 40 while concurrently cooling the combustion gas products traveling upwardly for exit through port 48. Further heat transfer to the heat transfer fluid in the tubes 26 also occurs in this zone, the heat transfer taking place both directly from the upwardly flowing combustion gas products, as well as indirectly from the heated sorbent material in the fluidized bed on the stages in this zone. In addition to the tubes which form an integral part of the distributor plate, other tubes are contained on each stage, each tube being connected to the entering and exit headers from the stage. These tubes lie above the distributor plate tubes and immersed in the beds of fluidized solids.

Stage 18e forms a "volatiles burnout" stage in which the volatile material released from the fuel applied to the stage below is burned. Stage 18f comprises the principal solid fuel burnout stage in which the fuel applied to port 42 is burned. Heat transfer to the heat transfer fluid in the tubes 26 of the stages occurs principly in the stages. Additionally, contaminants-capture by the sorbent material also occurs.

Finally, stages 18g–18i comprise an air preheat zone in which the incoming air applied through port 24 is preheated during its upward passage toward the combustion zones. Simultaneously, the spent sorbent material and fuel ash is cooled by the incoming combustion air as the sorbent and ash pass downwardly toward the discharge port 44.

The combustor so far described is expected to provide significant advantages over conventional fuel combustor systems, and preliminary prototype tests confirm this. Thus, the principle of counter-current flow, previously utilized to only limited advantage in fuel combustion systems, is utilized to maximum advantage in the present system, both in capturing noxious combustion product contaminants, as well as in effectuating maximum heat transfer to the heat transfer fluid. Conventional and inexpensive spreader-stokers can be used to feed the fuel to the combustor without concern for excessive sulfur oxide release from combustion of the volatile fuel since sorbent flow from the stages above the combustion zone provide sufficient residence time for capture of the sulfur contaminants.

Capital construction costs of the reactor are expected to be diminished since high heat transfer rates are achieved in each stage of the combustor. This reduces the heat transfer surface area requirements by a factor of as much as two to three over prior conventional systems in which the heat transfer surfaces were only partially submerged in the fluidized bed, the remainder of the surfaces residing primarily in the space above the fluidized bed where heat transfer rates are significantly lower. Additionally, the combustor of the present invention lends itself to operation with the top of the reactor operating at slightly negative pressure so that combustion gases and contaminants carried therein are confined and do not leak from the combustor. This eliminates the need for expensive seals on bins and hoppers storing the sorbent material which would otherwise be required to prevent the escape of combustion gases and contaminants. Further, since the spent sorbent and unburned fuel products exiting from the combustion zone are cooled significantly prior to discharge from the combustor, expensive hot-solids handling equipment is obviated.

For a given thermal output, the total bed depth (i.e., the sum of the bed depths of each stage) of the present combustor is expected to be approximately the same as that of the bed depth of prior combustors. Thus, the input power requirements for the blower fans of the two systems should thus be approximately the same.

The construction of each stage of the combustor of the present invention also offers significant advantages. Thus, the distributor plates of the present invention are expected to operate with a more uniform heat distribution than prior systems due, in large part, to the placement of the boiler tubes as an integral part of the distributor plates themselves. This minimizes local overheating and high thermal gradients which exist in many present systems. Further, by varying the heat transfer surface area from stage to stage, various portions of the process can be emphasized at a particular point in order to operate at high efficiency. For example, the temperature of the sulfur capture stages located above the fuel burning stages can be adjusted to maximize sulfur capture by modifying the relative heat transfer surface area of these stages.

FIG. 3 shows a modified form of downcomer which not only dynamically controls the height of the fluidized bed on a given stage but which also provides for continuous reactivation of sorbent material within the combustor itself. A vertically oriented downcomer 90 extends preferably between the volatiles fuel burnout stage 18e and the solid fuel combustion stage 18f of the combustor of FIG. 1. The top 92 of the downcomer is flush with the distributor plate of the upper stage, while the bottom of the downcomer is angled and terminates in a pivoted flap 92 which allows discharge of fluidized solids from the downcomer, but which impedes reverse flow of these solids into the downcomer at the bottom. An air line 94 entering the downcomer provides a flow of pressurized air (indicated by arrow 96) directed vertically within the downcomer, while a steam line 98 provides a pressurized flow of steam (designated by the arrow 100) upwardly within the downcomer.

The air jet provided by air line 94 maintains the solids within the pipe, as well as those immediately above it, in a flowing state. Additionally, it controls the rate at which fluidized material passes downwardly through the downcomer 90 to the stage below. By controlling the air flow rate through the air line 94, the height of the fluidized bed in the upper stage is controlled by controlling the rate at which solids are removed from that stage in downcomer 90. This provides a ready mechanism by which the steam output of the system can be throttled down during periods of low demand for steam and quickly increased during periods of increased demand for steam.

In addition to controlling the flow rate of solids to the combustion stage, the downcomer 90 regenerates sorbent material in a dynamic manner. In particular, as sorbents and fuel pass downwardly through downcomer 90, they are brought into contact with steam discharged by steamline 98. This steam hydrates the sorbent materials thereby expanding them. On further heating in solid fuel combustion stage, the crack to thereby expose the unreacted inner surface.

The expected comparative advantages of this system over presently available systems may be seen more graphically from the chart of FIG. 4 which shows the design details of the combustor of the present invention ("SCFBC") with a typical conventional atmospheric fluidized bed combustor ("AFBC") for a thermal output of 100,000,000 BTU/hr.

As may be seen from the FIG. 4, while approximately the same heat transfer surface area is required in the combustion beds in both systems, the heat transfer capacity for cooling the combustion gases is dramatically reduced in the present invention, and this provides a significant improvement in thermal efficiency and greatly reduces the construction and maintenance costs of the system by eliminating a significant proportion of the required heat transfer surface. Additionally, dolomite sorbent material can advantageously be used in the system of the present invention in addition to limestone; in contrast, typical combustors not incorporating the designs of the present invention can not use dolomite advantageously because the magnesium carbonate component of dolomite does not capture sulfur oxides at the operating bed temperature of typical combustors.

Various other features and advantages of the present invention will be clear to those skilled in the art and it is understood that the foregoing is to be taken as illustrative only, and not in a limiting sense, the scope of the invention being defined with particularity in the claims:

We claim:
1. A fluidized bed combustor characterized by
   A. a confining shell tapered inwardly from an intermediate portion thereof to upper and lower ends thereof,
   B. a plurality of vertically separated distributor plates within said shell of cross-section corresponding to the cross-section of the portion of the shell with which they are located and apertured for gas flow therethrough for maintaining a fluidized bed of solid materials thereon,
   C. means connecting said distributor plates in sequence for serial flow of solids from one stage to another in vertically descending direction while said combustor is operating,
   D. heat transfer tubes associated with each of at least a plurality of said stages and positioned for containment within the fluid bed of its corresponding stage during at least a portion of the operating time of said combustor for heat transfer with said bed,
   E. means for feeding sorbent material to an upper stage of said combustor for passage through successive stages in sequence and discharge at a lower stage thereof,
   F. means for feeding solid fuel to an intermediate stage of said combustor for combustion therein, the spent residue of said fuel passing to lower stages of said combustor for discharge with said sorbent.

2. A fluidized bed combustor characterized by a plurality of vertically spaced fluidized bed combustor stages formed from apertured distributor plates having a plurality of heat transfer tubes associated therewith for carrying heat transfer fluid therein, each of said stages serially interconnecting for solids transfer from stage to stage while said combustor is operating and, collectively, providing a plurality of zones for combustion, heat transfer, and contaminant removal, said combustion zone including at least a first stage forming a solid fuel combustion stage and a second stage forming a volatiles burnoff stage and including a downcomer interconnecting said first and second stages and providing sorbent flow from said second stage to said first stage, said combustor further including means for injecting steam into said downcomer for rejuvenation of said sorbents.

3. A combustor according to claim 2 which further includes means for feeding sorbent material to an upper stage for downward flow from stage to stage through said combustor, and intermixing with solid fuel applied to lower stages of said combustor.

4. A fluidized bed combustor according to claim 2 which furthen includes means for feeding solid fuel to an intermediate stage for combustion therein.

5. A fluidized bed combustor according to claim 2 in which said stages are of maximum cross-section at positions intermediate the combustor and are of successively diminished cross-section at locations progressively farther from said intermediate position.

6. A fluidized bed combustor characterized by a plurality of vertically spaced fluidized bed combustor stages formed from apertured distributor plates having a plurality of heat transfer tubes associated therewith for carrying heat transfer fluid therein, each of said stages serially interconnecting for solids transfer from stage to stage while said combustor is operating and, collectively, providing a plurality of zones for combustion, heat transfer, and contaminant removal, and means for feeding sorbent material to an upper stage for downward flow from stage to stage through said combustor and intermixing with solid fuel applied to lower stages of said combustor.

7. A fluidized bed combustor characterized by a plurality of vertically spaced fluidized bed combustor stages formed from apertured distributor plates having a plurality of heat transfer tubes associated therewith for carrying heat transfer fluid therein, each of said stages serially interconnecting for solids transfer from stage to stage while said combustor is operating and, collectively, providing a plurality of zones for combustion, heat transfer, and contaminant removal, and means for feeding solid fuel to an intermediate stage for combustion therein.

8. A fluidized bed combustor characterized by a plurality of vertically spaced fluidzied bed combustor stages formed from apertured distributor plates having a plurality of heat transfer tubes associated therewith for carrying heat transfer fluid therein, each of said stages serially interconnecting for solids transfer from stage to stage while said combustor is operating and, collectively, providing a plurality of zones for combustion, heat transfer, and contaminant removal, said stages being of maximum cross-section at positions intermediate the combustor and are of successively diminished cross-section at locations progressively farther from said intermediate position.

9. A process for burning solid fuel, comprising:
A. providing a multi-stage fluidized bed combustor having a plurality of vertically spaced fluidized bed stages interconnected for solids flow from one stage to another through gravity flow while said combustor is operating,
B. applying sorbent materials to upper stages for contact with rising gas combustion products,
C. applying solid fuel to intermediate stages for combustion therein,
D. cooling spent sorbent and fuel ash in lower stages and removing them therefrom.

* * * * *